United States Patent
Mellinger et al.

(10) Patent No.: US 7,444,304 B2
(45) Date of Patent: Oct. 28, 2008

(54) CREDIT CARD TRANSACTION TRACKING SYSTEMS AND METHODS

(75) Inventors: Philip T. Mellinger, Ellicott, MD (US); Brian P. Prendergast, Loganville, GA (US); Duane J. Ritter, Marietta, GA (US)

(73) Assignee: First Data Corporation, Greenwood Village, CO (US)

( * ) Notice: Subject to any disclaimer, the term of this patent is extended or adjusted under 35 U.S.C. 154(b) by 1598 days.

(21) Appl. No.: 10/091,001

(22) Filed: Mar. 4, 2002

(65) Prior Publication Data

US 2003/0167227 A1 Sep. 4, 2003

(51) Int. Cl.
G06Q 40/00 (2006.01)
(52) U.S. Cl. .............................. 705/39; 705/35; 705/37
(58) Field of Classification Search ............. 205/25–40; 705/10–44
See application file for complete search history.

(56) References Cited

U.S. PATENT DOCUMENTS

| | | | |
|---|---|---|---|
| 5,708,422 A | | 1/1998 | Blonder et al. |
| 5,903,830 A | * | 5/1999 | Joao et al. .................... 705/39 |
| 6,047,270 A | * | 4/2000 | Joao et al. .................... 705/39 |
| 6,254,000 B1 | | 7/2001 | Degen et al. |
| 6,369,705 B1 | * | 4/2002 | Kennedy .................... 705/39 |
| 6,400,270 B1 | * | 6/2002 | Person ........................ 705/39 |

OTHER PUBLICATIONS

Degen, et al. "System and Method for Detecting Fraudulent Calls". U.S. Appl. No. 09/948,729, filed Sep. 7, 2001.
Degen, et al. "Scoring Methodology for Purchasing Card Fraud Detection". U.S. Appl. No. 09/467,621, filed Dec. 20, 1999.

* cited by examiner

*Primary Examiner*—Frantzy Poinvil
(74) *Attorney, Agent, or Firm*—Townsend and Townsend and Crew LLP

(57) ABSTRACT

A method of monitoring financial transactions includes periodically receiving a list of target account identifiers at a processing server and periodically transmitting the list to each of a plurality of platform servers. The platform servers are each configured to receive transaction information that includes transaction records of financial transactions. The transaction records include account identifiers used in the transactions. The platform servers are configured to search the transaction information for transaction records having a target account identifier from the list. The method also includes receiving at the processing server an alert that the platform server has identified a transaction record having a target account identifier. The alert including transaction data from the transaction record. The method further includes transmitting from the processing server a notification based on the alert that a target account identifier has been identified in a transaction record. Analogous systems are also provided.

47 Claims, 3 Drawing Sheets

CREDIT CARD TRANSACTION TRACKING SYSTEMS AND METHODS

BACKGROUND OF THE INVENTION

This invention relates generally to the field of financial transactions, and in particular to financial transactions where one or more electronic records of the transaction are produced. More specifically, the invention relates to the monitoring of such financial transactions.

Every day millions of financial transactions occur throughout the world. In most cases, electronic records of the transactions are created. For example, one common type of financial transaction involves the use of a presentation instrument, such as a credit card, a debit card, and the like. When such a presentation instrument is used to make a purchase, information stored on the card is often read by a point of sale device which creates an electronic record of the purchase. In the case of credit cards, the information read by the point of sale device along with the amount of the purchase may be routed through various other entities in order to complete the purchase. For example, the transaction information may be electronically sent to the merchant's bank or financial institution, to a card hold association, such as VISA or MasterCard, and to the issuer's bank or financial institution. Each of these entities may also store information regarding the transaction.

Recent events have proven that presentation instruments may be used by individuals for potentially harmful or illegal activities. However, the task of identifying suspect purchases in sufficient time to monitor individuals making such purchases has proven to be difficult, even when various electronic records of such transactions exist.

In addition to the monitoring of financial transaction for suspicious activities, there is also a need to monitor financial transactions for other reasons. For example, a primary card holder having an account with secondary or other cardholders may wish to monitor purchases charged to the account in near real time. Marketing groups may also wish to know spending habits of consumer in a more expedited manner.

Hence, this invention is related to the monitoring of financial transactions and of producing reports on financial activities in a more expedited manner.

BRIEF SUMMARY OF THE INVENTION

Embodiments of the present invention thus provide a method of monitoring financial transactions. The method includes periodically receiving a target account identifier of a suspect account and receiving financial transaction information. The financial transaction information includes transaction records for a plurality of financial transactions that each have at least one associated account identifier. The method further includes comparing the target account identifier with the transaction information to determine if the target account identifier matches any of the account identifiers of the transaction information. If a match is found, the method further includes generating an alert having at least a portion of the transaction record that has an account identifier matching the target account identifier.

The method may include electronically transmitting the alert to a provider of the target account identifier, to an owner of the suspect account, to a designee of a provider of the target account, and/or a compiler of marketing information relating to the account. The marketing information may include the spending habits of a user of the suspect account. The target account identifier may include a suspect credit card number. The transaction records may include transaction location, data of transaction, time of transaction, and account holder name. The comparing and transmitting steps may be performed within about 15 minutes, 5 minutes, one minute, or less from the time that a transaction record having an account identifier matching the target account identifier is received. Generating the alert may include processing electronic data into an electronic textual message representing at least a portion of the content of the electronic data.

In other embodiments, methods of monitoring financial transactions include, at a processing server, periodically receiving a list having a plurality of target account identifiers and periodically transmitting at least a portion of the list to one or more platform servers. The one are more platform servers are each configured to receive transaction information that includes transaction records of financial transactions. The transaction records include account identifiers used in the transactions. The one or more platform servers are configured to search the transaction information for transaction records having a target account identifier from the list. The method also includes at the processing server, receiving from a platform server an alert that the platform server has identified a transaction record having a target account identifier. The alert includes transaction data from the transaction record. The method also includes transmitting from the processing server a notification based on the alert that a target account identifier has been identified in a transaction record.

The list may be contained in an electronic file from a government agency. The list may be received by the processing server at least daily. The list may be requested by at least one platform server at least daily. The method may also include, upon receipt of the list at the processing server, transmitting from the processing server a list available message to at least one platform server indicating that the processing server has received the list, in response to which at least one platform server transmits a request to the processing server to send the list. The method also may include transmitting the list from the processing server to at least one platform computer upon receipt of the list by the processing server. The notification may be transmitted by email and may be transmitted to a personal computer, including such personal computers as, for example, a mobile phone, personal pager, or personal digital assistant. The method may further include processing the alert at the processing server by combining transaction data from the alert with stored transaction data relating to the target account identifier, in which case the notification may be based on the alert and the stored transaction data.

In other embodiments, methods of monitoring financial transactions include receiving from a processing server a list having at least a target account identifier and receiving transaction information. The transaction information includes transaction records of financial transactions, which include account identifiers used in the transactions. The method also includes searching the transaction information for transaction records having a target account identifier from the list. Upon the occurrence of a match, an alert is generated having at least a portion of the transaction record that has an account identifier matching a target account identifier. The method also includes transmitting the alert to the processing server.

In still other embodiments, a system for monitoring financial transactions includes a processing server and at least one platform server in electronic communication with the processing server. The processing server is configured to receive a list of target account identifiers and transmit the list to the at least one platform server. The at least one platform server is configured to receive the list of target account identifiers. The at least one platform server is further configured to receive transaction information, including transaction records of financial transactions having account identifiers used in the transactions. The at least one platform server is further configured to compare the account identifiers in the transaction records to target account identifiers on the list. Upon the occurrence of a match between a target account identifier and an account identifier in a transaction record, the at least one platform server is configured to produce an alert and transmit the alert to the processing server. The processing server is configured to produce a notification based on the alert and transmit the notification to a personal computer.

In yet other embodiments, a system for monitoring financial transactions includes a processing server and a communications arrangement associated with the processing server. The communications arrangement is configured to facilitate electronic communication between the processing server and at least a platform server. The processing server is configured to receive a list of target account identifiers and transmit the list to a platform server. A platform server is configured to receive the list of target account identifiers. A platform server is further configured to receive transaction information, including transaction records of financial transactions having account identifiers used in the transactions. A platform server is further configured to compare the account identifiers in the transaction records to target account identifiers on the list. Upon the occurrence of a match between a target account identifier and an account identifier in a transaction record, a platform server is configured to produce an alert and transmit the alert to the processing server. The processing server is configured to produce a notification based on the alert and transmit the notification to a personal computer. The personal computer may be, for example, a mobile phone, personal pager, or personal digital assistant.

In still other embodiments, a system for monitoring financial transactions includes a platform server and a communications arrangement associated with the platform server. The communications arrangement is configured to facilitate electronic communication between the platform server and a processing server. The processing server is configured to receive a list of target account identifiers and transmit the list to the platform server. The platform server is configured to receive the list of target account identifiers and to receive transaction information, including transaction records of financial transactions having account identifiers used in the transactions. The platform server is further configured to compare the account identifiers in the transaction records to target account identifiers on the list. Upon the occurrence of a match between a target account identifier and an account identifier in a transaction record, the platform server is configured to produce an alert and transmit the alert to the processing server. The processing server is configured to produce a notification based on the alert and transmit the notification to a personal computer.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
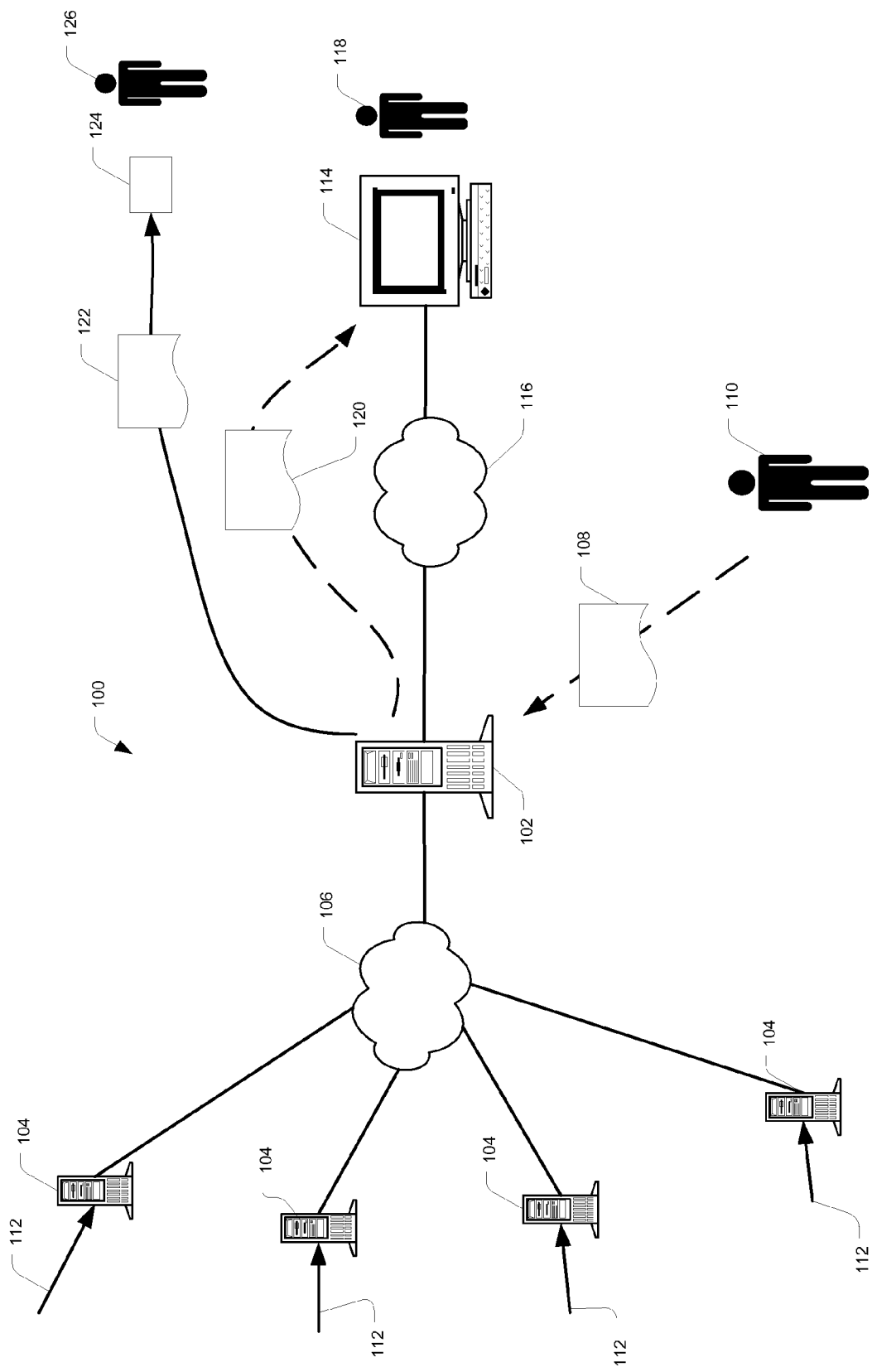
FIG. 1 illustrates a system for monitoring financial transactions according to embodiments of the present invention.

Credit services may be established with essentially any type of person, entity, organization, business, or the like that wishes to take payments for goods or services in the form of a credit, and, for convenience of discussion, are generally referred to herein as "merchants". Such merchants may process a credit transaction based on an account identifier presented at the time of payment. The account identifier is used to identify the account to which the credit will eventually be posted. In many cases, the account identifier is provided on some type of presentation instrument, such as a credit card, debit card, smart card, stored value card, or the like. Conveniently, the account identifier may be read from a point of sale device, such as those described in copending U.S. application Ser. No. 09/634,901, entitled "POINT OF SALE PAYMENT SYSTEM," filed Aug. 9, 2000 by Randy J. Templeton et al., which is a nonprovisional of U.S. Prov. Appl. No. 60/147,899, entitled "INTEGRATED POINT OF SALE DEVICE," filed Aug. 9, 1999 by Randy Templeton et al, the complete disclosures of which are herein incorporated by reference. However, the account identifier may be obtained in other ways, such as by visual inspection of the presentation instrument, by telephone, over the Internet, and the like.

The user account information is transmitted to a credit processing service that approves and processes the transaction information and provides payment to the merchant. The credit processing service includes at least one platform server that receives and processes the transaction information. One example of a credit processing service is the service provided by First Data Corporation, Greenwood Village, Colo.

For various reasons, especially in light of recent events involving terrorist activities, it may be desirable to know when and where a specific account, identified by an account identifier, is being or has been used. It may be further desirable to know when and where the account is being used within a brief period of time after the account is used. In fact, in some cases, the information is desired in real time, or as close to real time as possible.

According to embodiments of the present invention, a credit processing service receives a list of target account identifiers. The list may be received, for example, from a government agency interested in apprehending or monitoring the users of the accounts represented by the account identifiers. Alternatively, the list of targeted account identifiers may be provided by marketing researchers interested in monitoring the purchasing activities of the account users. It may also be the case that an account owner, such as a spouse, parent, or employer, wishes to monitor the usage habits of account users, such as a spouse, child or employee. Many other reasons for monitoring account activity by tracking the usage of targeted account identifiers are possible.

The credit processing organization then searches the transaction information transmitted to it for processing and identifies transactions involving any of the target account identifiers. Upon finding such a transaction, the processing service compiles a message containing relevant portions of the transaction information and transmits the message to the generator of the target account identifier list or a designee of the generator.

Having described the present invention generally, it will be described in more detail with reference to FIG. 1, which illustrates an exemplary financial transaction monitoring system 100 according to the present invention. While FIG. 1 illustrates an exemplary financial transaction monitoring system, those of ordinary skill in the art will recognize other financial transaction monitoring systems to which the present invention may be applied or with which it may be used. Thus, this example of the present invention should not be considered limiting.

The system 100 includes a processing server 102 and a plurality of platform servers 104. The processing server 102 is in communication with the platform servers 104 via a network 106. The processing server 102 and the platform servers 104 may be any of a number of well known computing devices. For example, the processing server 102 and the platform servers 104 may be database servers, workstations, personal computers, combinations of the foregoing, and the like. The network 106 may be any of a number of well known networks or network combinations that facilitate the transmission of electronic signals. For example, the network 106 may be a local area network, a wide area network, the Internet, and the like. Many other examples for the processing server 102, platform servers 104, and network 106 are possible.

The processing server 102 is configured to receive a file 108 from a requestor 110. The file 108 contains a list of target account identifiers for which the requestor 110 wishes to obtain transaction data. The target account identifiers may be credit card account numbers and the like, and may represent a suspect account, such as an account suspected of being related to illegal activity. The file 108 may or may not be in electronic form. For example, the requestor 110 may send the file electronically via email, file transfer, and the like. Alternatively, the requester 110 may call the credit processing service on a telephone and relay the content of the file by voice or fax. It is also possible that the requester 110 may hand deliver or mail the file 108 to the credit processing service. Other means for transferring the file 108 are possible. The file 108 may be sent to the credit processing service one a regular schedule, such as daily or hourly, or the file 108 may be sent to the credit processing service as additional target account identifiers are identified. In any case, the content of the file 108 is input in electronic form into the processing server 102.

The platform servers 104 receive the list of target account identifiers from the processing server 102 via the network 106. Alternatively, the content of the file 108 may be relayed directly to one or more of the platform servers 104 by the requester 110. The platform servers 104 may receive the list according to any of a variety of processes. For example, the platform servers 104 periodically may request the list from the processing server 102, in response to which request the processing server 102 transmits the list. The request may be sent daily, or weekly, hourly, or according to any other periodic schedule. Alternatively, the processing server 102 may transmit the list according to a similar periodic schedule. In yet another alternative, the processing server 102 may transmit a notification to the platform servers 104 each time the list is updated at the processing server 102, in response to which the platform servers 104 may transmit a request when, for example, bandwidth permits. Many other process for transmitting the list of target account identifiers from the processing server 102 to the platform servers 104 are possible. It may also be the case that only portions of the list are sent to particular ones of the platform servers 104, according to the types of transaction information processed by each platform server.

The platform servers 104 are configured to receive transaction information 112 from merchants or other entities that process credit transactions or accept account identifiers. Each platform server may receive transaction information 112 from a specific region that may be determined geographically or by other means. The transaction information 112 includes transaction records of transactions in which account identifiers are used. The transaction records include account identifiers used in the transaction. Additionally, the transactions records may contain other data, such as, for example, the place, date, and time of the transaction, the identity of the holder of the account represented by the account identifier, and the like.

Among other things, the platform servers 104 review the transaction information 112 for transaction records in which a target account identifier is involved. Upon the occurrence of such, the discovering platform server 104 produces an alert based on the transaction record. The alert may contain the target account identifier, the date of the transaction, the time of the transaction, the place of the transaction, and the like. It may be necessary for the platform server 104 to translate the transaction record into a different format, which will be described with reference to FIG. 2.

Figure 2:
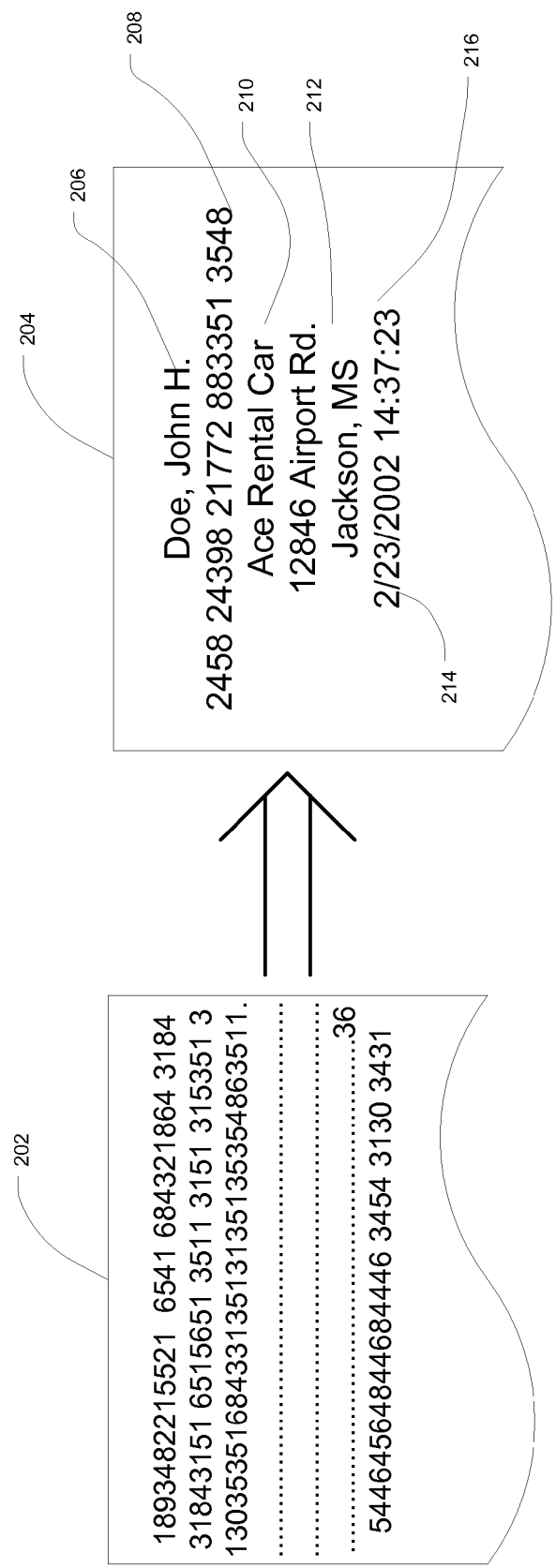
FIG. 2 illustrates the conversion of a transaction record to an alert according to embodiments of the present invention.

Referring to FIG. 2, a transaction record 202 and an alert 204 are illustrated. The transaction record 202 may contain an electronic representation of the transaction in a machine readable form, the textual representation of which may not be very useful. Thus, the platform server may convert the machine readable electronic representation of the transaction into a different electronic format, the textual representation of which is more user friendly. For example, the alert 204 may include a user friendly electronic representation of the account holder name 206, the account identifier 208, the name of the merchant 210, the address of the merchant or the location where the account identifier was presented as payment 212, the date 214 and the time 216 of the transaction, and the like.

Returning to FIG. 1, the alert may be transmitted from a platform server 104 to the processing server 102. In some embodiments of the invention, the electronic format of the alert may be converted, as explained above, at the processing server 102 instead of at the platform server 104 that generated the alert. It is advantageous, according to the present invention, for the alert to be transmitted from the platform server 104 to the processing server 102 as soon as possible after the transaction takes place, preferably in real or near-real time. Near-real time may be any time period that is as close as possible to real time. For example, real time may be within 45 minutes, fifteen minutes, ten minutes, five minutes, or even one minute. Other examples of near-real time are also possible.

Upon receipt of an alert, the processing server 102 performs several tasks. The processing server 102 may display the content of the alert on a display device 114 associated with the processing server 102 so that the alert may be viewed by an observer 118, such as an analyst. The display device 114 may be a computer monitor, a printer, or the like, or the display device may be another computing device, such as a personal computer, workstation, and the like. The display device 114 may be co-located with the processing server 102, or the display device 114 may be in communication with the server computer 102 via a second network 116. The second network 116 may be the same network as network 106, or it may be a different network. The second network 116 may be any of a number of well known networks or network combinations that facilitate the transmission of electronic signals. For example, the second network 116 may be a local area network, a wide area network, the Internet, and the like. Many other examples for the second network 116 are possible.

The processing server 102 may also compile a list 120 of alerts and transmit the list 120 of alerts to the same or a different display device 114 for observation by the same or a different analyst or observer 118. The list 120 may be sent via the network 116 or by other means.

The processing server 102 may also process the alert and store the content of the alert for later use. For example, the processing server 102 may compile transaction data over time relating to an account until the account reaches a threshold, such as a spending limit. The processing server 102 may also compile information relating to the items or services purchased using a target account identifier for later use in marketing research.

The s processing server 102 may also generate a notification 122 based on the alert. The notification 122 may include the entire content of the alert or may include only a portion of the content of the alert. The notification may also include additional information not included in the alert. In other words, the processing server 102 may append additional information to the alert to create the notification 122. The processing server 102 then transmits the notification 122 to a personal computer 124 associated with a recipient 126. The personal computer 124 may be a pager, a mobile phone, a personal digital assistant, and the like. The personal computer 124 may also be a desktop or laptop computer. The notification may be transmitted via any of a number of methods, such as over a network or as a radio or satellite transmission.

The recipient 126 may be the requester 110, or a designee of the requestor 110. For example, the recipient 126 may be a law enforcement official in the vicinity of the location where the transaction took place, in which case the server computer may select the recipient 126 based on the content of the alert. In other examples, the recipient 126 may be the account owner who desires to monitor the spending habits of an account user, in which case the notification may be sent only after a spending threshold is reached. The processing server 102 also may send the notification to multiple recipients. Many other possibilities exist.

Figure 3:
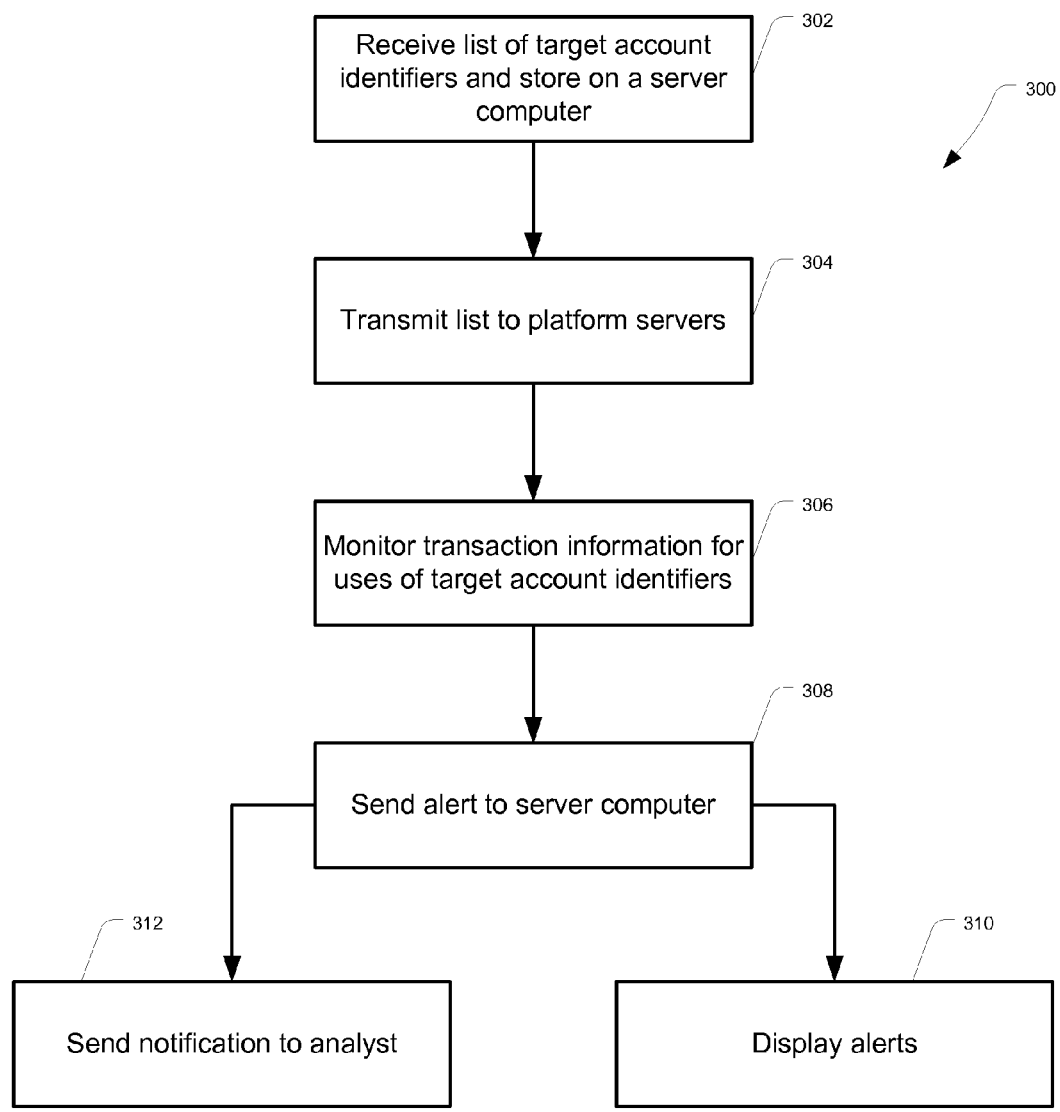
FIG. 3 illustrates a method of monitoring financial transactions according to the present invention.

Referring to FIG. 3, a method 300 of monitoring financial transactions according to the present invention is illustrated. The method includes receiving a list of target account identifiers at a processing server (operation 302). As previously discussed with reference to FIG. 1, the list may be received in many forms and according to many different schedules, or no specific schedule. The operation 320 includes transcribing the list into a computer readable form, if necessary, and storing the list on the processing server.

At operation 304, the list is transmitted to one or more platform servers. Also as previously discussed with reference to FIG. 1, the process by which the list is transmitted to the one or more platform computers may include a periodic request from each platform computer to transmit the list, in response to which the processing server transmits the list. The process may also include the processing server automatically transmitting the list to the platform computers, either on a periodic schedule or each time the list is updated at the processing server. In yet another alternative, the processing server may send a "list available" message to the platform computers when the list is updated, in response to which the platform servers request the list when able. Combinations of the aforementioned processes are also possible.

At operation 306, the platform computers monitor transaction information for target account identifiers from the list. The operation 306 includes the platform servers receiving transaction information from merchants or other entities that accept account identifiers in exchange for goods or services in anticipation of later payment. The platform servers search for the target account identifiers in transaction records in the transaction information.

At operation 308, the platform servers send an alert to the processing server upon the occurrence of a match of a target account identifier to an account identifier in a transaction record. The alert may include the account identifier, the date, time, and place of the transaction, as well as other relevant information. Prior to sending the alert, the platform computer may translate the content of the alert from one electronic format to a more user friendly electronic format.

At operation 310, the processing server may display the alert on a display device for observation by an analyst or other observer. The processing server may also display a compilation of alerts received by the processing server on the same or a different display device.

At operation 312, the processing server may send a notification to an analyst, the generator of the list of target account identifiers, or other designee of the generator. The notification may include the same information as the alert, additional information to the alert, or a portion of the information in the alert. The notification may be sent, for example, by email, page, and the like. The notification may be received by a personal computing device such as a pager, personal digital assistant, desktop or laptop computer, or mobile phone worn or carried by, or simply accessible to the recipient.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Accordingly, the above description should not be taken as limiting the scope of the invention, which is defined in the following claims.

What is claimed is:

1. A method of using a computer to monitor financial transactions, the method comprising:

periodically receiving at a computer system a target account identifier of a suspect account;

receiving financial transaction information at the computer system, the financial transaction information including transaction records for a plurality of financial transactions that each have at least one associated account identifier, wherein the financial transaction information is received at the computer system immediately after or while the financial transactions occur, and wherein a plurality of the associated account identifiers are different from the target account identifiers;

at the computer system, comparing the target account identifier with the transaction information as the financial transaction information is received at the computer system to determine if the target account identifier matches any of the account identifiers of the transaction information;

upon the occurrence of a match, generating an alert having at least a portion of the transaction record that has an account identifier matching the target account identifier; and transmitting the alert to a recipient.

2. The method as in claim 1, wherein the recipient comprises a provider of the target account identifier.

3. The method as in claim 1, wherein the recipient comprises an owner of the suspect account.

4. The method as in claim 1, wherein the recipient comprises a designee of a provider of the target account.

5. The method as in claim 1, wherein the recipient comprises a compiler of marketing information relating to the account.

6. The method of claim 5, wherein the marketing information includes the spending habits of a user of the suspect account.

7. The method as in claim 1, wherein the target account identifier comprises a suspect credit card number.

8. The method as in claim 1, wherein the transaction records further include transaction location, data of transaction, time of transaction and account holder name.

9. The method as in claim 1, wherein the comparing and transmitting steps are performed within 15 minutes from the time that a transaction record having an account identifier matching the target account identifier is received.

10. The method as in claim 1, wherein the comparing and transmitting steps are performed within 5 minutes from the time that a transaction record having an account identifier matching the target account identifier is received.

11. The method as in claim 1, wherein the comparing and transmitting steps are performed within 1 minute from the time that a transaction record having an account identifier matching the target account identifier is received.

12. The method as in claim 1, wherein generating the alert includes processing electronic data into an electronic textual message representing at least a portion of the content of the electronic data.

13. A method of monitoring financial transactions, comprising:
   at a processing server, periodically receiving a list having a plurality of target account identifiers;
   periodically transmitting at least a portion of the list to one or more platform servers, wherein the one or more platform servers are each configured to receive transaction information while the transactions are occurring in order to process associated financial transactions, the transaction information including transaction records of the financial transactions, the transaction records including associated account identifiers used in the transactions, wherein a plurality of the associated account identifiers are different from the target account identifiers, and wherein the one or more platform servers are configured to search the transaction information as the transaction information is received at the one or more platform servers for transaction records having a target account identifier from the list;
   at the processing server, receiving from one of the platform servers an alert that the platform server has identified a transaction record having one of the target account identifiers, the alert including transaction data from the transaction record; and
   transmitting from the processing server a notification based on the alert that the target account identifier has been identified in a transaction record.

14. The method of claim 13, wherein the list comprises an electronic file from a government agency.

15. The method of claim 13, wherein the list is received by the processing server at least daily.

16. The method of claim 13, wherein the list is requested by at least one platform server at least daily.

17. The method of claim 13, further comprising, upon receipt of the list at the processing server, transmitting from the processing server a list available message to at least one platform server indicating that the processing server has received the list, in response to which at least one platform server transmits a request to the processing server to send the list.

18. The method of claim 13, further comprising transmitting the list from the processing server to at least one platform computer upon receipt of the list by the processing server.

19. The method of claim 13, wherein the notification is transmitted by email.

20. The method of claim 13, wherein the notification is transmitted to a personal computer.

21. The method of claim 20, wherein the personal computer is selected from the group consisting of mobile phone, personal pager, and personal digital assistant.

22. The method of claim 13, wherein the notification is transmitted within 15 minutes from the time that the alert is received.

23. The method of claim 13, wherein the notification is transmitted within 5 minutes from the time that the alert is received.

24. The method of claim 13, wherein the notification is transmitted within 1 minutes from the time that the alert is received.

25. The method of claim 13, wherein the transaction record includes, date of usage, time of usage and location of usage.

26. The method of claim 13, wherein the notification includes the account identifier, the data the identifier was used, the time the account identifier was used, and the address where the account identifier was used.

27. The method of claim 13, further comprising processing the alert at the processing server by combining transaction data from the alert with stored transaction data relating to the target account identifier, and wherein the notification is based on the alert and the stored transaction data.

28. A method of monitoring financial transactions, comprising:
   receiving from a processing server a list having at least a target account identifier;
   receiving transaction information at the platform computer, the transaction information including transaction records of financial transactions, the transaction records including associated account identifiers used in the transactions, wherein the transaction information is received at the platform computer as associated transactions are being performed in order to approve the transactions, and wherein a plurality of the associated account identifiers are different from the target account identifiers;
   searching the transaction information as the transaction information is received at the platform computer for transaction records having target account identifiers from the list;
   upon the occurrence of a match, generating an alert having at least a portion of the transaction record that has an account identifier matching a target account identifier; and
   transmitting the alert to the processing server.

29. The method of claim 28, further comprising requesting the list from the processing server.

30. The method as in claim 28, wherein generating the alert includes processing electronic data into an electronic textual message representing at least a portion of the content of the electronic data.

31. A system for monitoring financial transactions, comprising:
a processing server; and
at least one platform server in electronic communication with the processing server;
wherein the processing server is configured to receive a list of target account identifiers and transmit the list to the at least one platform server, wherein the at least one platform server is configured to receive the list of target account identifiers, wherein the at least one platform server is further configured to receive transaction information, including transaction records of financial transactions having associated account identifiers used in the transactions in order to approve the transactions, wherein a plurality of the associated account identifiers are different from the target account identifiers; wherein the at least one platform server is further configured to compare the associated account identifiers in the transaction records to target account identifiers on the list, wherein, upon the occurrence of a match between one of the target account identifiers and one of the account identifiers in one of the transaction records, the at least one platform server is configured to produce an alert and transmit the alert to the processing server, wherein the processing server is configured to produce a notification based on the alert and transmit the notification to a personal computer.

32. The system of claim 31, wherein the list comprises an electronic file from a federal agency.

33. The system of claim 31, wherein the list is received by the processing server at least daily.

34. The system of claim 31, wherein the list is requested by at least one platform server at least daily.

35. The system of claim 31, further comprising, upon receipt of the list at the processing server, transmitting from the processing server a list available message to at least one platform server indicating that the processing server has received a list, in response to which the at least one platform server transmits a request to the processing server to send the list.

36. The system of claim 31, further comprising transmitting the list from the processing server to at least one platform server upon receipt of the list by the processing server.

37. The system of claim 31, wherein the notification is transmitted by email.

38. The system of claim 31, wherein the notification is transmitted to a personal computer.

39. The system of claim 31, wherein the personal computer is selected from the group consisting of mobile phone, personal pager, and personal digital assistant.

40. The system of claim 31, wherein the notification is transmitted from the processing server within 15 minutes from the time the processing server receives the alert.

41. The system of claim 31, wherein the notification is transmitted from the processing server within 5 minutes from the time the processing server receives the alert.

42. The system of claim 31, wherein the notification is transmitted from the processing server within 1 minutes from the time the processing server receives the alert.

43. The system of claim 31, wherein the transaction record includes, date of usage, time of usage and location of usage.

44. The system of claim 31, wherein the notification includes the account identifier, the data the identifier was used, the time the account identifier was used, and the address where the account identifier was used.

45. A system for monitoring financial transactions, comprising:
a processing server; and
a communications arrangement associated with the processing server, the communications arrangement being configured to facilitate electronic communication between the processing server and at least a platform server;
wherein the processing server is configured to receive a list of target account identifiers and transmit the list to a platform server, wherein a platform server is configured to receive the list of target account identifiers, wherein the platform server is further configured to receive transaction information as transactions are being processed, including transaction records of financial transactions having account identifiers used in the transactions, wherein a plurality of the account identifiers used in the transactions are different from the account identifiers, wherein the platform server is further configured to compare the account identifiers in the transaction records to target account identifiers on the list, wherein, upon the occurrence of a match between one of the target account identifiers and one of the account identifiers in one of the transaction records, the platform server is configured to produce an alert and transmit the alert to the processing server, wherein the processing server is configured to produce a notification based on the alert and transmit the notification to a computer.

46. The system of claim 45, wherein the personal computer is selected from the group consisting of mobile phone, personal pager, and personal digital assistant.

47. A system for monitoring financial transactions, comprising:
a platform server; and
a communications arrangement associated with the platform server, the communications arrangement being configured to facilitate electronic communication between the platform server and a processing server;
wherein the processing server is configured to receive a list of target account identifiers and transmit the list to the platform server, wherein the platform server is configured to receive the list of target account identifiers, wherein the platform server is further configured to receive transaction information as transactions are occurring in order to approve the transactions, including transaction records of financial transactions having account identifiers used in the transactions, wherein a plurality of the account identifiers used in the transactions are different from the target account identifiers, wherein the platform server is further configured to compare the account identifiers in the transaction records to target account identifiers on the list as the transaction records are received, wherein, upon the occurrence of a match between one of the target account identifier and one of the account identifiers in one of the transaction records, the platform server is configured to produce an alert and transmit the alert to the processing server, wherein the processing server is configured to produce a notification based on the alert and transmit the notification to a computer.

* * * * *